April 28, 1925.
H. R. COLLINS
1,535,903
PULVERIZED FUEL BURNER
Filed March 14, 1922
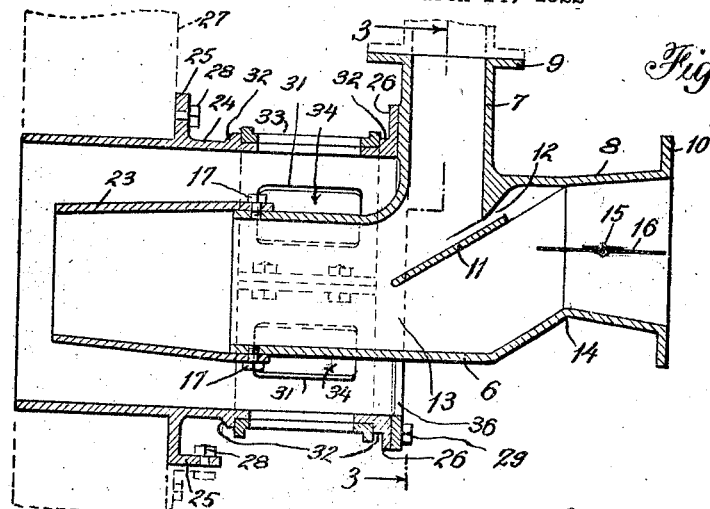
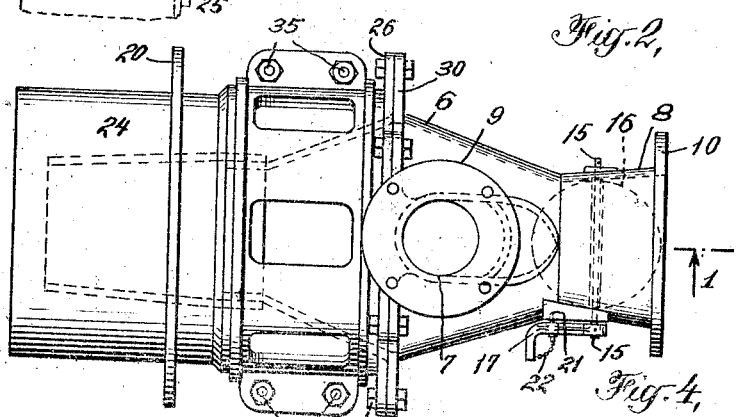
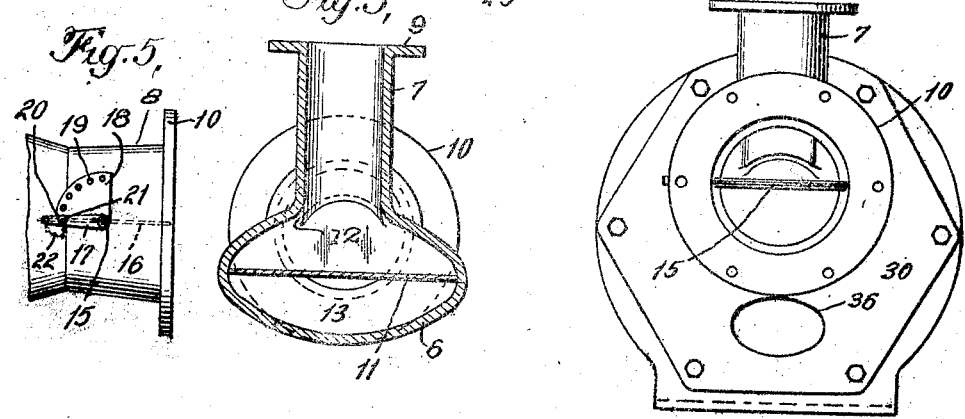
INVENTOR
Harry R. Collins
BY
Fennie Davis
ATTORNEY Patented Apr. 28, 1925.

1,535,903

UNITED STATES PATENT OFFICE.

HARRY RAYMOND COLLINS, OF ALLENTOWN, PENNSYLVANIA, ASSIGNOR TO FULLER-LEHIGH COMPANY, A CORPORATION OF PENNSYLVANIA.

PULVERIZED-FUEL BURNER.

Application filed March 14, 1922. Serial No. 543,603.

*To all whom it may concern:*

Be it known that I, HARRY R. COLLINS, a citizen of the United States, residing at Allentown, in the county of Lehigh, State of Pennsylvania, have invented certain new and useful Improvements in Pulverized-Fuel Burners; and I do hereby declare the following to be a full, clear, and exact description of the invention, such as will enable others skilled in the art to which it appertains to make and use the same.

This invention relates to a burner for use with pulverized fuel which is delivered mixed with air to the chamber in which combustion takes place. In burners of this type it is desirable that the fuel should be delivered into the combustion chamber as a uniform mixture of fuel and air, and the caking together of the particles of fuel, such as frequently occurs in the feeding operation, should be prevented so far as possible. Ordinarily pulverized fuel is delivered to such burners by means of a feeding device, such, for instance, as a power-driven screw, and in the passage of the material through the screw, caking may take place which would result in lumps of fuel of considerable size being delivered into the furnace. This is an undesirable condition because such lumps of caked fuel cannot be maintained in suspension for a sufficient length of time to permit them to be completely consumed and consequently there is a loss in the heating efficiency because this unconsumed fuel is deposited on the floor of the furnace and is removed with the ash.

The present invention involves the provision of a burner which is arranged to obtain a complete and uniform mixing of the fuel and air and includes means by which the supply of air is itself used in assisting to break up any lumps which may be formed in the feeding apparatus by which the fuel is delivered to the burner. In one type the burner includes the usual mixing chamber with the fuel and air inlets, together with a deflector plate which is arranged to extend partly across both of these openings. This plate serves to intercept the fuel entering the chamber through the fuel inlets and its arrangement with respect to the walls of the chamber is such that two passage-ways for air currents are provided, one of which flows above, the other below the plate. When the entering fuel strikes the plate any lumps which may have formed in it are at once broken up, and the current of air which passes over the plate serves to force the fuel from the plate and deliver it into the path of the main air stream, where it is taken up and conveyed through the burner nozzle into the furnace in the usual way. In addition to the deflector plate, the burner includes means which may take the form of a damper, disposed within the air inlet, by which a greater or less quantity of air may be deflected so as to pass above the plate. This damper means, therefore, serves as a means for controlling the rate of flow over the top of the plate and permits this flow to be so regulated as to prevent any accumulation of fuel on the upper surface of the plate. With this arrangement the conglomerated masses of fuel are disintegrated and in addition the fuel is given a thorough and uniform aeration within the mixing chamber.

The invention will be better understood from the following description in connection with the accompanying drawings, in which—

Fig. 1 is a longitudinal section of the burner taken along the line 1—1 of Fig. 2;

Fig. 2 is a top plan view of the burner;

Fig. 3 is a section taken along the line 3—3 of Fig. 1;

Fig. 4 is an end view of the burner; and

Fig. 5 is a side view of the air admission end of the burner and shows the adjusting means for the damper in the air inlet.

Referring to the drawings, the mixing chamber 6 of the burner has a fuel inlet 7 and an inlet for air 8, which inlets are arranged with their axes substantially at right angles, the fuel inlet being vertically positioned and the air inlet horizontally disposed. The fuel inlet 7 is provided with a flange 9 by which it is connected to any suitable form of feeding device, as, for instance, a screw feed, for carrying the coal from a source of supply such as a bin to a position above the fuel inlet into which it then drops by gravity. The air inlet 8 has a flange 10 for connecting it with a pipe or conduit leading from a blower or fan (not shown). Within the chamber 6 is a deflector plate 11 which extends across the chamber and has its upper and lower ends spaced from the walls of the chamber as shown in Fig. 1. The space between the upper part of the deflector and the wall of the chamber provides a passageway 12 and that between the lower part of the deflector and chamber wall, a passageway 13. The cross sectional area of the casing is of a shape somewhat flattened vertically and enlarged transversely as is shown in Fig. 3. By this conformation of the casing wall, the passageway 13 beneath the deflector 11 is enlarged to a considerable extent by adding to the total cross sectional area of the chamber about the deflector, and the parts are so dimensioned that the passageway 13 is made substantially equal in area to the smallest area of the air inlet which would, in the burner illustrated, be about at the point 14. Thus, air flows through the burner at the rate of its admission through the burner inlet undiminished by any tendency for the deflector to check the flow which would otherwise be the case were the passageway for air through the chamber restricted by the deflector.

As the fuel is carried to the burner by the feeding device, it drops by gravity through the fuel inlet 7 and strikes the deflector plate 11. The fuel striking the plate 11 is deflected therefrom in a direction which causes it to fall in front of the passageway 13. The incoming air from the blower through the air inlet 8 strikes the deflector plate 11 and most of it is deflected downwardly through the passageway 13 beneath the plate, the remainder flowing through the passageway 12 above the plate. The portion of the air current which flows through the passageway 13 constitutes the main current of air for mixing with the fuel and discharging it from the casing 6. The smaller volume of air or auxiliary current which flows through the passageway 12 passes over the plate and into the fuel descending through the inlet 7. This auxiliary current acts to break up and aerate the descending fuel before it strikes the deflector plate, and furthermore, the surface of the latter is continually kept clear of any accumulations of fuel by being constantly swept by the auxiliary air current.

Pivotally mounted on a shaft 15 set in the wall of the air inlet 8 is a damper 16 for regulating the volume of air admitted into the burner. This damper is mounted for rotation through an angle of about 90° from the full open position illustrated in Fig. 1 to the closed position which would be at right angles thereto. For setting the damper in these and intermediate positions, the shaft 15 is provided at one end with a lever or handle 17 which moves over a quadrant 18 consisting of a sector plate secured to the outside of the air inlet 8. The quadrant 18 is provided with a series of circularly disposed sockets 19, and the lever 17 has an aperture 20 therein, situated at the same distance from the shaft 15 as the sockets 19 in order that the aperture may be brought in registry with the sockets. The damper 16 is moved by means of the handle 17 and the latter has secured thereto a pin 21 mounted on a chain 22, secured at the end of the handle, which is adapted to be inserted through the aperture 20 and into one of the sockets 19, with which the aperture is brought in registry, to lock the damper in adjusted position. It will be seen that by moving the damper in a clockwise direction from the position illustrated in Fig. 1 to intermediate positions approaching the closed position of the damper, the damper may be secured in the open or closed positions and step by step in intermediate positions by inserting the pin in the different sockets of the quadrant, and the volume of air admitted into the mixing chamber of the burner will accordingly be varied or the air supply entirely cut off as required. The adjustment of the damper for regulating the admission of air in this manner results also in a change of the direction of flow of the incoming air through the inlet, and as the damper is moved from the full open position to positions approaching the closing of the damper, a greater amount of air is directed toward the upper part of the deflector plate 11, thus increasing the auxiliary current of air through the passageway 12 and decreasing the main fuel discharging current through the passageway 13. Such regulation is desirable in practice in order that the breaking up of masses of fuel and the cleansing of the upper surface of the plate 11 may be rendered more effective when necessary, and the flow of the main fuel discharging current cut down in accordance with the requirements of operation.

Secured to the end of the mixing chamber 6, as by means of bolts 17, is a nozzle 23. In the burner illustrated in the drawings, this nozzle is round in form, but it will be understood that any other suitable form of nozzle might be employed, such as a nozzle of flattened shape for projecting the mixture of fuel and air into the combustion chamber of the furnace in the form of a flat stream or ribbon, and the burner is made in different sizes to accommodate various quantities of fuel and air for a given unit of time.

Surrounding and enclosing the nozzle 23 and a portion of the chamber 6 is a casing 24 which is provided with flanges 25 and 26 for securing it to a wall of the furnace indicated at 27 and the casing 6 respectively, the fastening means employed being bolts as indicated at 28 and 29, the latter passing through a flange 30 on the walls of the chamber 6. The casing 24 is provided with a plurality of circumferentially disposed air ports 31 and has cast therein guides 32 between which is mounted a split sleeve or register 33 having openings 34 therein which correspond in size to the air ports 31 in the casing, the halves of the sleeve being flanged and secured together by means of bolts 35. The sleeve 33 is rotatable in the guides 32 to bring the air ports 31 and the openings 34 into and out of registry to vary the size of the openings for the admission of air induced into the casing 24 by action of the fuel and air mixture issuing from the nozzle 23. The air induced into the casing 24 by this entraining action is an additional air supply which is necessary to complete the combustion of the fuel, and the amount of air admitted into the furnace through the casing 24 for this purpose is regulated by means of the sleeve 33 in accordance with working conditions.

The flange 30 of the chamber 6 is provided with a sight hole 36 through which the action in the casing 24, the jet of mixed fuel and air projected from the nozzle 23 into the combustion chamber, and the flame resulting from the ignition of this jet may be observed.

I claim:

1. In a pulverized fuel burner, a closed chamber having an inlet for fuel, an inlet for compressed air and an outlet through which the fuel is discharged with the compressed air, and a flat deflector plate lying in front of the fuel and air inlets and in inclined relation to the axes of these inlets, this plate serving to intercept the fuel entering the chamber through the fuel inlet, and also being so arranged with respect to the walls of the chamber as to divide the incoming compressed air into two currents, one of which is relatively small and passes over that surface of the deflector plate which the incoming fuel strikes, to assist in dislodging the fuel therefrom, and the other of which is relatively large, and passing beneath the plate, constitutes the main air current by which the fuel is discharged through the outlet.

2. In a pulverized fuel burner, a chamber provided with an inlet for fuel, and an inlet for air under pressure, a deflector plate mounted in the chamber and lying in front of the fuel inlet in inclined relation to the axis thereof to intercept and deflect the fuel entering the chamber through the fuel inlet, this plate being so arranged in relation to the walls of the air inlet as to form passageways through which the entering air under pressure passes both above and below the plate, the area of the passageway above the plate being relatively small in comparison to the passageway below the plate, and a damper in the air inlet spaced from the plate and adjustable for regulating the relative rates of flow of the air above and below the plate.

3. In a pulverized fuel burner, a closed chamber having an inlet for fuel, an inlet for compressed air, and an outlet through which the fuel is discharged with the compressed air, the inlet for fuel and the inlet for air being adjacent and having their axes disposed at an angle to each other, and a flat deflector plate lying in front of the fuel and air inlets and in inclined relation to the axes of these inlets, this plate serving to intercept the fuel entering the chamber through the fuel inlet and being so arranged with respect to the walls of the chamber as to divide the incoming compressed air into two currents, one of which is relatively small and passes over that surface of the deflector plate which the incoming fuel strikes, to assist in dislodging the fuel therefrom, and the other of which is relatively large and, passing beneath the plate, constitutes the main air current into which the fuel is delivered from the plate to be discharged through the outlet.

4. In a pulverized fuel burner, a mixing chamber, inlets for fuel and air thereto, and a deflector plate arranged to receive the fuel from the inlet therefor and to deflect it in the path of an air current for discharging fuel from the burner, the deflector being spaced from the walls of the chamber to provide passageways for a main fuel discharging current under the plate and an auxiliary current above the plate, and the chamber being flattened vertically and enlarged transversely so as to make the area of the passageway under the deflector plate substantially the same as the smallest area of the air inlet.

5. In a pulverized fuel burner, a mixing chamber, an inlet for fuel and an inlet for air under pressure in the chamber, a flat deflector plate disposed in front of the fuel inlet to intercept the entering fuel, this plate also lying in front of the air inlet and being so arranged with relation to the walls of the air inlet as to form passageways both above and below the plate through which the air under pressure passes into the mixing chamber, the intercepted fuel on the plate passing therefrom into the path of the air current passing through the passageway below the plate, and a damper situated in the air inlet in spaced relation to the deflector plate and adjustable to control the relative rates of flow of air through the passageway.

6. In a pulverized fuel burner, a mixing chamber, inlets for fuel and air thereto, a flat deflector plate arranged in front of the air inlet to receive fuel from the fuel inlet and to deflect it in the path of a fuel discharging current of air, said deflector plate being spaced from the upper and lower walls of the chamber and forming therewith passageways for dividing the current of air from the air inlet into separate currents above and below the deflector plate, and a damper situated in the air inlet in spaced relation to said deflector plate, said damper being provided with means by which it may be adjusted to change the direction of the incoming air current with respect to the deflector plate before the current of air reaches said plate.

7. In a pulverized fuel burner, a mixing chamber, an inlet for the admission of fuel and an inlet for the admission of air under pressure into the chamber, these inlets being disposed substantially at right angles to each other, a flat deflector plate mounted in the chamber in inclined relation to the axis of both inlets, this plate extending partly across both inlet openings and having one surface arranged to intercept the fuel entering the chamber through the fuel inlet, the deflector plate being so arranged with relation to the walls of the air inlets as to provide passageways for dividing the entering current of air under pressure into two currents, one of which passes over the plate and discharges the fuel therefrom, and the other of which passes below the plate and takes up the fuel discharged from the plate, and a damper fitted in the air inlet in spaced relation to the rear edge of the plate and provided with means for maintaining it in adjusted position to control the relative rates of flow of air under pressure above and below said plate.

8. In a pulverized fuel burner, a closed chamber having an inlet for fuel, an inlet for compressed air, and an outlet including a nozzle through which the fuel is discharged with the compressed air, a flat deflector plate lying in front of the fuel and air inlets and in inclined relation to the axes of these inlets, this plate serving to intercept the fuel entering the chamber through the fuel inlet and also being arranged with respect to the walls of the chamber so as to divide the incoming compressed air into two currents, one of which passes over the surface of the deflector plate by which the incoming fuel is intercepted to assist in dislodging the fuel therefrom, and the other of which passes beneath the plate and constitutes the main air current by which the fuel is discharged through the nozzle, a casing secured to the chamber and inclosing the nozzle, a plurality of air inlet ports in the casing behind the nozzle, and means for controlling the admission of air through the ports.

9. In a pulverized fuel burner, a mixing chamber provided with inlets for fuel and air, these inlets being arranged at an angle to each other, a flat deflector plate mounted in the chamber in inclined relation to the axes of both inlets, this plate being so arranged with respect to the walls of the air inlet as to provide passageways for the air entering the chamber both above and below the plate, a nozzle connected with the chamber and providing an outlet therefor, a casing enclosing part of the chamber and the nozzle and serving as means for mounting the burner in the furnace, this casing being provided with air inlet ports disposed behind the nozzle, a sleeve mounted on the casing and movable to control the size of the ports, and a damper in the air inlet of the chamber, adjustable to different positions to control the relative rates of air flow above and below the plate.

10. In a pulverized fuel burner, a mixing chamber having inlet openings for the admission of fuel and air, a deflector plate mounted in the chamber in inclined relation with respect to the axes of both inlet openings, this plate extending partly across both openings and having one surface which serves to intercept and deflect the fuel entering the chamber through the fuel inlet, the plate also being so arranged with respect to the walls of the air inlet opening as to provide passageways for air both above and below the plate, and an angularly adjustable damper mounted in the air inlet of the casing in spaced relation to the rear edge of the deflector plate, this damper being angularly adjustable to cause a part of the air entering the inlet to be deflected above the deflector plate.

11. In a pulverized fuel burner, a mixing chamber having inlet openings for the admission of fuel and air, and a deflector mounted in an inclined position within the chamber in line with the fuel inlet opening, the passage for air through the burner being enlarged in cross section about the deflector so that the flow of air through the burner will not be checked by the deflector.

In testimony whereof I affix my signature.

HARRY RAYMOND COLLINS.